Figures 3, 4:
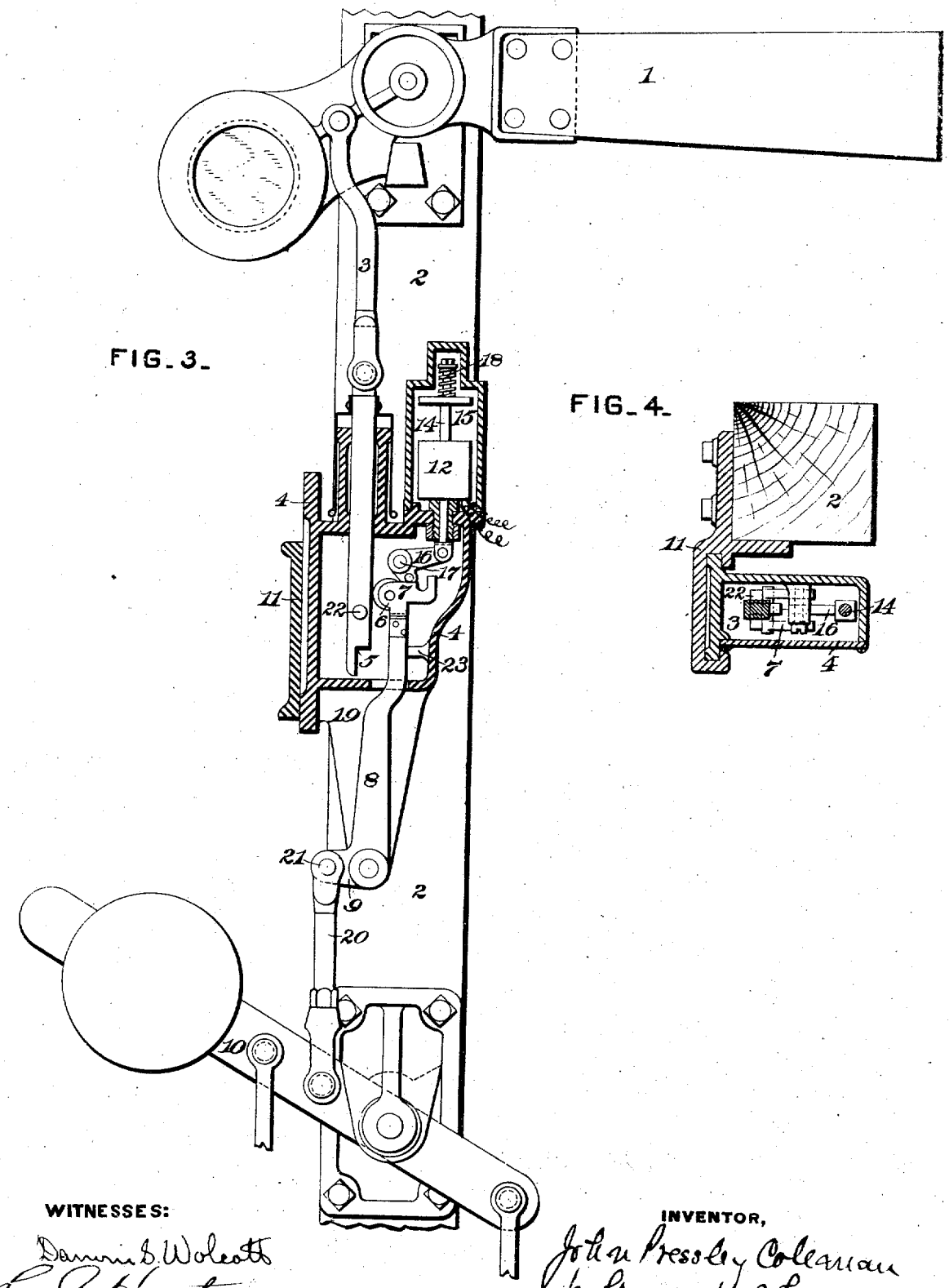

2 Sheets—Sheet 1.
J. P. COLEMAN.
ELECTRIC SIGNALING APPARATUS.
No. 11,428. Reissued July 10, 1894.
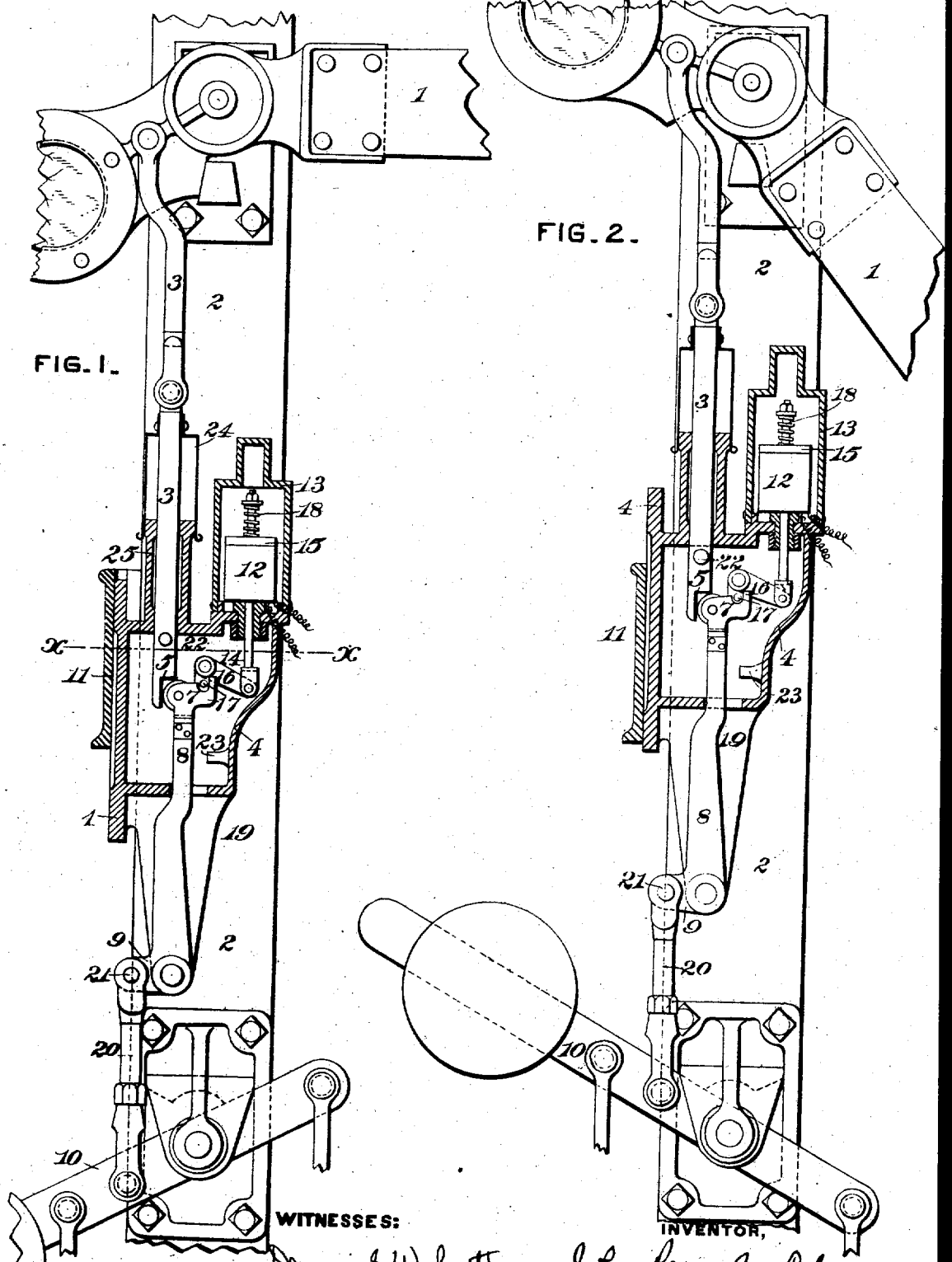
WITNESSES:
Damon S. Wolcott
C. E. Hunt.
INVENTOR,
John Pressley Coleman
by George H. Christy
Att'y.

2 Sheets—Sheet 2.

J. P. COLEMAN.

ELECTRIC SIGNALING APPARATUS.

No. 11,428. Reissued July 10, 1894.

WITNESSES:

Damon S. Wolcott

E. B. Hunt.

INVENTOR,

John Pressley Coleman by George H. Christy Att'y.

UNITED STATES PATENT OFFICE.

JOHN PRESSLEY COLEMAN, OF SWISSVALE, PENNSYLVANIA, ASSIGNOR TO THE UNION SWITCH AND SIGNAL COMPANY, OF SAME PLACE.

ELECTRIC SIGNALING APPARATUS.

SPECIFICATION forming part of Reissued Letters Patent No. 11,428, dated July 10, 1894.

Original No. 395,315, dated January 1, 1889. Application for reissue filed December 5, 1893. Serial No. 492,387.

*To all whom it may concern:*

Be it known that I, JOHN PRESSLEY COLEMAN, of Swissvale, in the county of Allegheny and State of Pennsylvania, have invented a new and useful Improvement in Electric Signaling Apparatus; and I do hereby declare the following to be a full, clear, and exact description thereof, reference being had to the accompanying drawings, forming part of this specification, in which—

Figure 1 is a sectional elevation of my improved device for operating a semaphore-signal, showing it as it is when the controlling electric circuit is closed or in its normal "safety" condition, but before the operative mechanism has been operated to shift the signal from its "danger" position (shown in the drawings) to the "safety" position. Fig. 2 is a similar view showing the position of the parts when the signal has been shifted to safety position. Fig. 3 shows the position of the parts when the signal has automatically gone to danger, the circuit through the controlling magnet being broken, and Fig. 4 is a horizontal section on the line *x*, *x*, Fig. 1.

Like symbols of reference indicate like parts in each.

My invention relates to an improvement in electrical apparatus for railroad-signals, commonly known as an "electrical slot," which consists of mechanism operated electrically from a distance, either automatically by action of a passing train or otherwise, so that when there is a break in the electric circuit in which the slot is included the parts are so moved that the semaphore is brought automatically into a "danger" position, and the connection with the mechanically-operating parts of the semaphore is disjoined, so that it cannot again be brought into a position of "safety" until the electric circuit is again established. This system of signaling is one which is well understood, and as my invention relates only to the apparatus constituting the slot it will not be necessary that I should further describe the system of which it forms a part.

The semaphore or other suitable signal, 1, is mounted in the usual manner on the post 2, the short or lantern end of which is weighted, so as to raise it into a horizontal position indicating "danger" when free to move. To the short arm of the semaphore is connected the upright signal-operating rod, consisting of a rod, 3, which extends down beside the post into a box or frame, 4, its lower end having a recess, 5, adapted to engage a friction-roller, 6, which is mounted between the forked ends forming the head 7 of the bell-crank lever 8, which forms a continuation of the sectional operating-rod. This lever 8, whose upper end is arranged within the box or frame 4, is pivoted between lugs or hangers 19, which form part of the box or frame, and the short arm 9 of this lever is connected by a rod, 20, to the usual weighted lever, 10, which in turn is connected with a suitable operating-lever or other device.

In order to protect the box 4 from rain, which might otherwise find access to its interior, I provide the connecting-rod 3 with a hollow hood or cap, 24, which is fixed to the rod and works loosely over a projection, 25, of the box within which the rod passes.

The box or frame 4 is so mounted in ways 11 on the post 2 as to permit of its vertical movement, as will be hereinafter more fully described. On top of the box or frame 4, within a protecting-cap, 13, is set an electro-magnet, 12, included in the electric circuit before mentioned. Through this magnet, which is preferably annular in construction, passes the rod 14, having at its upper end an armature, 15, and at its lower end extending down into the box 4 and connecting with the long arm of a bell-crank lever or trigger, 16, the short arm of which has a pin, 17, which is adapted to engage a notch in the head 7 in certain positions of the latter. The upper end of the rod 14 is reduced in diameter, thereby forming a shoulder for supporting the armature 15, located on the rod above the shoulder and held against it by a spring, 18, which surrounds the rod and bears at its upper end against a washer held in position by adjusting-nuts at the end of the rod. The function of this spring is to prevent the jar of the dropping of the weighted lever, 10, injuring the armature. This it does by acting as a cushion between the armature and its seating on the magnets.

The operation of the device is as follows:

Suppose the parts to be as shown in Fig. 1—*i. e.* the electric circuit being completed, holding the armature 15 in contact with the magnets 12. The semaphore 1 is at "safety" and is supported by the friction-roller 6, being held in the recess 5 in the lower end of the rod 3 by the bell-crank lever 16, the pin 17 of that lever being in the notch in the head 7 of the lever 8, and the long arm of the bell-crank lever or trigger 16 being depressed by the attractive force of the magnets on the armature 15. While the roller 6 is held in the notch in the lower end of the rod 3, as shown in Figs. 1 and 2, the weight of the box 4 is in part upon the pivot pin 21 connecting the arm 9 of the lever 8 with the rod 20, and in part upon the stop 22 on the rod 3, so that if the circuit of the magnet 12 be broken while the parts are in the position shown in Fig. 1, the weight of the box will tend to cause the lever 8 to be shifted to the right, but such tendency will be checked by the stop 22, which, as the signal is at danger and its rod 8 stationary as against any downward movement, will prevent sufficient downward movement of the box to effect any material lateral movement of the arm 8. While the circuit of the magnet 12 is broken as stated, an upward movement of the lever 10 will first so shift the lever 8 on its pivot that the roller 6 will be dislodged from the notch 5, and will then raise the box 4, without raising the rod 3, thereby leaving the signal at danger. If the lever 10 be moved to raise the rod 20 the entire stress comes upon the pivot 21, which connects this rod with the arm 9 of the lever 8, and if it were not for the attractive force of the magnet 12 the lever 8 would be thrown over to the right, so as to disengage the roller 6 from the rod 3. As it is, however, the magnet acting on the armature, opposes this force and keeps the friction-roller in the notch 5, and hence the effect is to raise up not only the box 4, but the rod 3 as well, thus depressing the signal into the "safety" position, as shown in Fig. 2. If, now, the circuit through the magnets 12 be broken from any cause the consequent demagnetization of the magnets 12, releasing the pull on the armature 15, causes the weight of the signal and the box 4, acting on the lever 8, to turn this lever to the right on its pivotal point until it comes into contact with a stop, 23, and thereby to disengage the head of the lever 8 from the rod 3 and to raise the trigger-lever 16. The rod 3 and the semaphore-signal are then unsupported, and the semaphore consequently rises to a horizontal "danger" position, while the rod 3 drops within the case 4, as shown in Fig. 3. As long as the circuit of the magnet remains broken, the operator cannot shift the signal to safety position. Suppose, now, that the electric circuit is closed by a train having passed off a track-section or otherwise. Then if the lever 10 be turned, so as to lower the box 4 and its contained parts, the lever 8 will descend with the box until the friction-roller 6 at the end of the lever comes opposite to the notch 5 at the lower end of the rod 3, when the lever will move to the left, so as to engage this roller in the notch 5 and to engage the notch on the head 7 of the lever 8 with the pin 17 of the trigger-lever 16, at the same time moving this trigger-lever so as to bring the armature 15 into contact with the excited magnet 12. The parts are then in the position shown in Fig. 1, and any motion of the lever 10 in the reverse direction will raise the rod 3 and will shift the signal to "safety," as will be readily understood.

It sometimes occurs that the signal will remain at safety position even after the circuit of the magnet 12 is broken. In such case, the operator will shift the lever 10 so as to lower the box 4, which as it descends will strike against the stop 22 on the rod 3, and pull the signal to normal or danger position.

As thus constructed the apparatus is of very great utility, because of its simplicity of construction, cheapness, and ease of action. The compound arrangement of the levers is such that an electric circuit of comparatively little strength may be employed for holding the trigger 16 in position and resisting the displacement of the lever 8. The parts may, however, be greatly modified in form and location without departing from the principle of my invention, as expressed in the claims which form part of this specification.

Instead of the semaphore-signal which I show, the apparatus may be adapted to operate other forms of signal.

One of the distinguishing features of my invention is the use of the pivoted lever 8, which forms part of the operating mechanism of the signal, and which is movable on its pivot into and out of operative relation to the other connecting mechanism. The advantage of this construction over prior devices, wherein two sliding rods or plates are used for this purpose, is that I obtain a mechanism capable of great certainty of action and not liable to be injuriously affected by the action of rust or gum.

I claim—

1. In an apparatus for connecting a signal with its primary actuating mechanism, the combination, with the signal and its connecting-rod, of a pivoted lever which forms one of the mechanical connections between the signal and the actuating mechanism, said lever being movable on its pivot into and out of connection with the signal connecting-rod, and an electro-magnet which acts on the lever to hold it in connection with the said signal connecting-rod, substantially as and for the purposes described.

2. In an apparatus for connecting a signal with its primary actuating mechanism, the combination, with the signal and its connecting-rod, of a pivoted lever which forms one of the mechanical connections between the signal and the actuating mechanism, said lever being movable on its pivot into and out of connection with the signal connecting-rod, a trigger which engages the rod and holds the rod and lever in connection, and an electro-magnet which controls the trigger, substantially as and for the purposes described.

3. The combination of an electric circuit, a signal, a movable box or frame, a lever pivoted thereto and arranged to engage the signal-operating mechanism, a trigger controlled by an electro-magnet for holding the lever in operative relation with the signal, said lever being connected with the moving mechanism of the box or frame, which acts thereon against the force of the magnet and tends to disengage the lever from the signal, substantially as and for the purposes described.

4. In an apparatus for connecting a signal with its primary actuating mechanism, the combination, with the signal and its connecting-rod, of a pivoted lever which forms one of the mechanical connections between the signal and the actuating mechanism, said lever being movable into and out of connection with the signal connecting-rod, an electro-magnet and its armature which acts on the lever to hold it in connection with the said signal connecting-rod, and a spring which bears on the armature, substantially as and for the purposes described.

5. In an apparatus for connecting a signal with its primary actuating mechanism, the combination, with the signal and its connecting-rod, of a rod or lever which is movable vertically to operate the signal, a box or case into which said rod or lever projects, said box or case being connected with the rod or lever and moving with it in its motions to operate the signal, and a magnet and its armature which are inclosed by the box or case and which act on said rod or lever to hold it in operative connection with the signal connecting-rod, substantially as and for the purposes described.

In testimony whereof I have hereunto set my hand this 29th day of November, 1893.

JOHN PRESSLEY COLEMAN.

Witnesses:

J. C. MOCK,

GEO. D. FOWLE.